(12) United States Patent
Guo et al.

(10) Patent No.: US 11,670,812 B1
(45) Date of Patent: Jun. 6, 2023

(54) THERMAL MANAGEMENT DEVICE FOR ENERGY STORAGE SYSTEM, METHOD FOR CONTROLLING THE THERMAL MANAGEMENT DEVICE FOR ENERGY STORAGE SYSTEM, AND ENERGY STORAGE SYSTEM

(71) Applicant: Shenzhen Kubo Energy Technology Co., Ltd, Shenzhen (CN)

(72) Inventors: Zijian Guo, Shenzhen (CN); Xi Zheng, Shenzhen (CN); Kuan Li, Shenzhen (CN); Jinlai Shang, Shenzhen (CN); Xiaoli Guo, Shenzhen (CN); Guoping Hu, Shenzhen (CN)

(73) Assignee: SHENZHEN KUBO ENERGY TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/987,395

(22) Filed: Nov. 15, 2022

(30) Foreign Application Priority Data

Dec. 28, 2021 (CN) .......................... 202111622902.5

(51) Int. Cl.
*H01M 10/63* (2014.01)
*H01M 10/633* (2014.01)
(Continued)

(52) U.S. Cl.
CPC ...... *H01M 10/633* (2015.04); *G05D 23/1917* (2013.01); *H01M 10/052* (2013.01);
(Continued)

(58) Field of Classification Search
CPC ............. H01M 10/633; H01M 10/613; H01M 10/635; H01M 10/6568; H01M 10/6569;
(Continued)

(56) References Cited

FOREIGN PATENT DOCUMENTS

| CN | 108321448 A | 7/2018 |
|---|---|---|
| CN | 108736499 A | 11/2018 |

OTHER PUBLICATIONS

Machine Translation CN108736499A (Year: 2018).*
Machine translation CN108321448A (Year: 2018).*

* cited by examiner

*Primary Examiner* — Victoria H Lynch
(74) *Attorney, Agent, or Firm* — WPAT, PC

(57) ABSTRACT

The invention provides a thermal management device for energy storage system, a method for controlling the thermal management device for energy storage system, and an energy storage system, wherein the thermal management device for energy storage system comprises a heat dissipation system, a temperature transducer, a data acquisition module, a management module and a data interaction module; the heat dissipation system comprises refrigerant circulating heat exchange components for heat dissipation of energy storage system, wherein the refrigerant circulating heat exchange components perform heat exchange through phase change of refrigerant; the data acquisition module is connected with the temperature transducer, and is used for acquiring the external environment temperature and the working environment temperature of energy storage system; the management module is used for conducting heating value analysis of energy storage system, and then performing heat dissipation control and management according to the heating value analysis and the external environment temperature; the data interaction module is used for connecting the network for data interaction. The energy storage system comprises battery packs, a battery management system, a bidirectional converter, an energy management system and the above thermal management device for energy storage system. During the control of thermal management, data are acquired in real time to determine and control the refrigerant quantity required for refrigerant circulation and thus realize efficient heat dissipation of energy storage system.

8 Claims, 2 Drawing Sheets

(51) Int. Cl.
*H01M 10/613* (2014.01)
*H01M 10/6568* (2014.01)
*H01M 10/6569* (2014.01)
*H01M 10/635* (2014.01)
*H01M 10/42* (2006.01)
*H01M 10/052* (2010.01)
*H01M 10/44* (2006.01)
*H02J 7/00* (2006.01)
*H02J 7/08* (2006.01)
*H02M 1/12* (2006.01)
*G05D 23/19* (2006.01)

(52) U.S. Cl.
CPC ....... *H01M 10/425* (2013.01); *H01M 10/441* (2013.01); *H01M 10/613* (2015.04); *H01M 10/635* (2015.04); *H01M 10/6568* (2015.04); *H01M 10/6569* (2015.04); *H02J 7/0013* (2013.01); *H02J 7/0048* (2020.01); *H02J 7/08* (2013.01); *H02M 1/12* (2013.01); *H01M 2010/4271* (2013.01); *H02J 2207/20* (2020.01)

(58) Field of Classification Search
CPC ............. H01M 10/052; H01M 10/425; H01M 10/441; H01M 2010/4271; H02J 7/0048; H02J 7/0013; H02J 7/08; H02J 2207/20; G05D 23/1917; H02M 1/12
See application file for complete search history.

THERMAL MANAGEMENT DEVICE FOR ENERGY STORAGE SYSTEM, METHOD FOR CONTROLLING THE THERMAL MANAGEMENT DEVICE FOR ENERGY STORAGE SYSTEM, AND ENERGY STORAGE SYSTEM

BACKGROUND OF THE INVENTION

1. Field of the Invention

The invention relates to the technical field of modular energy storage system and heat dissipation device for the modular energy storage system, in particular to a thermal management device for energy storage system, a method for controlling the thermal management device for energy storage system, and an energy storage system.

2. Description of Related Art

Energy storage system comprises energy-matter input and output equipment, and energy conversion and storage equipment; energy storage system involves various energies, equipment and matters as well as many processes, and it is a complex energy system that changes with time, as shown in FIG. 1. Distributed energy storage system is more complex, so coordination control is very necessary.

No matter when the energy storage system inputs or outputs energy, there is energy loss, the lost energy is generally converted into heat that increases the working environment temperature of equipment, and the resultant excessive temperature affects equipment efficiency, even damages equipment or causes accidents like fire. Therefore, the heat dissipation management of energy storage system is very important. However, the existing heat dissipation management of energy storage system is extensive, and the temperature control accuracy is not high, resulting in the decrease of energy storage efficiency; the energy consumption caused by the heat dissipation of energy storage system is large, resulting in other waste.

SUMMARY OF THE INVENTION

In order to solve the above technical problems, the invention provides a thermal management device for energy storage system, wherein the thermal management device for energy storage system comprises a heat dissipation system, a temperature transducer, a data acquisition module, a management module and a data interaction module;

The heat dissipation system comprises refrigerant circulating heat exchange components for heat dissipation of energy storage system, wherein the refrigerant circulating heat exchange components perform heat exchange through phase change of refrigerant;

The data acquisition module is connected with the temperature transducer, and is used for acquiring the external environment temperature and the working environment temperature of energy storage system;

The management module is used for conducting heating value analysis of energy storage system, and then performing heat dissipation control and management according to the heating value analysis and the external environment temperature;

The data interaction module is used for connecting the network for data interaction.

In an optional embodiment, the refrigerant circulating heat exchange components comprise a heat exchanger, a fan, a refrigerant pipeline, a radiator, a radiator fan, a regulating pump and a refrigerant storage tank;

The heat exchanger and the radiator are connected through a refrigerant pipeline to form a refrigerant circulating channel, with the radiator installed above the heat exchanger;

The heat exchanger and the fan are installed at the thermovent of energy storage system, wherein the fan is used for making the air pass through the heat exchanger for heat exchange;

The radiator and the radiator fan are installed in the external environment, wherein the radiator fan is used for making the outside air pass through the radiator for heat dissipation;

The regulating pump and the refrigerant storage tank are connected with the refrigerant pipeline, and the inlet and outlet of the regulating pump are provided with reversing pipelines for pumping refrigerant into or out of the refrigerant pipeline, so as to regulate the refrigerant quantity in the refrigerant circulating channel;

The fan, the radiator fan and the regulating pump are all electrically connected with the management module.

In an optional embodiment, the data acquisition module is connected with multiple pressure transducers, wherein the pressure transducers are respectively installed in the refrigerant pipeline and the refrigerant storage tank.

In an optional embodiment, the management module is connected with an intelligent touch screen, wherein the intelligent touch screen is used for displaying a control interface to operate and/or view the running state.

The invention also provides an energy storage system, wherein the energy storage system comprises battery packs, a battery management system, a bidirectional converter, an energy management system and the above thermal management device for energy storage system;

The battery pack comprises multiple lithium iron phosphate battery modules, and the lithium iron phosphate batteries in the lithium iron phosphate battery modules are used for storing electric energy;

The battery management system is connected with the battery packs and the bidirectional converter respectively, and is used for managing the charging and discharging of battery;

The bidirectional converter comprises voltage-stabilizing and rectifying components and inverter components, wherein the voltage-stabilizing and rectifying components and the inverter components are both connected with the battery packs; the voltage-stabilizing and rectifying components are connected with a power generation equipment to adjust power generation and then charge battery, and the inverter components are connected with a power transmission equipment to change the electric energy stored in battery into a power supply can be used by the electric equipment;

The energy management system is connected with the battery management system and the bidirectional converter respectively, and is used for monitoring the battery power and managing the charging and discharging according to a predetermined strategy;

The battery packs, the battery management system, the bidirectional converter and the energy management system are configured with a heat dissipation system of the thermal management device for energy storage system, wherein the heat dissipation system comprises refrigerant circulating heat exchange components performing heat exchange through phase change of refrigerant.

In an optional embodiment, multiple battery packs are distributed;

The energy management system is internally provided with a managing model, and is used for monitoring the real-time capacity, charging capacity and discharging capacity of each battery pack;

The managing model generates multiple groups of managing schemes according to managing demands, and predicts power generation and/or electricity consumption through monitoring data; according to the prediction, loss analyses about the charging and/or discharging of each group of managing schemes are conducted to select the managing scheme with the minimum loss as the managing execution scheme.

In an optional embodiment, the voltage-stabilizing and rectifying components comprise a rectifying circuit and a voltage-stabilizing circuit, wherein the rectifying circuit converts the alternating current of power generation equipment into direct current, and the voltage-stabilizing circuit stabilizes the voltage of direct current to be the same as that of battery pack.

In an optional embodiment, the inverter components comprise an inverter bridge circuit, a logic control circuit and a filter circuit, wherein the inverter bridge circuit is used for converting the direct current of battery pack into alternating current, the filter circuit is used for filtering the alternating current, and the logic control circuit is used for performing the logic control of process of converting the direct current into alternating current.

The invention also provides a method for controlling the thermal management for energy storage system, wherein the method is used for the above thermal management device for energy storage system and comprises the following steps:

S100, acquiring the external environment temperature and the working environment temperature of energy storage system in real time;

S200, determining the refrigerant quantity by a preset algorithm, i.e., the refrigerant quantity required by the refrigerant circulation in the refrigerant circulating heat exchange components under the condition of ensuring heat exchange through phase change of refrigerant;

S300, controlling the refrigerant circulating heat exchange components to perform heat exchange through phase change of refrigerant, so as to realize the heat dissipation of energy storage system.

In an optional embodiment, in step S100, the whole process of charging and discharging the battery packs of energy storage system is monitored;

In step S200, the heat dissipation demand of energy storage system is predicted by the set prediction model, and is compared with the maximum heat dissipation capability of the refrigerant circulating heat exchange components, and if the predicted heat dissipation demand is greater than the maximum heat dissipation capability of the refrigerant circulating heat exchange components, then an alarm is given.

The invention relates to a thermal management device for energy storage system, a method for controlling the thermal management device for energy storage system, and an energy storage system. The energy storage system of the invention is a modular distributed system and comprises battery packs, a battery management system, a bidirectional converter, an energy management system and a thermal management device for the energy storage system. For the electrical equipment that need heat dissipation in the energy storage system, a thermovent is set, the above heat dissipation system, i.e., the heat dissipation system of the thermal management device for the energy storage system, is arranged at the thermovent, the data acquisition module is connected with the transducer to acquire data, and the management module conducts heating value analysis of the energy storage system, and then performs heat dissipation control and management according to the heating value analysis and the external environment temperature. During the control of thermal management, data are acquired in real time to determine and control the refrigerant quantity required for refrigerant circulation and thus ensure that the refrigerant circulating heat exchange components of the heat dissipation system perform heat exchange through phase change of refrigerant, wherein the phase change process uses the latent heat characteristics of refrigerant to increase the heat exchange temperature difference, improve the heat exchange efficiency, reduce the energy consumption of the energy storage system for heat dissipation, and realize energy conservation under the condition of ensuring the working temperature of the energy storage system; besides, the data interaction module is set to connect with the network for data interaction to enable remote access and control, thus reducing workload and labor and improving efficiency.

Other features and advantages of the invention will be set forth in the following specification, and part of them will be obvious from the specification, or may be learned by practice of the invention. The objects and other advantages of the invention can be realized and obtained by the structures particularly pointed out in the specification, claims and figures.

The technical scheme of the invention will be further described in detail by the following figures and embodiments.

BRIEF DESCRIPTION OF THE DRAWINGS

The figures are used for further understanding of the invention, and form a part of the specification; together with the embodiments of the invention, the figures are used for explaining the invention, but do not limit the invention. In the figures.

DETAILED DESCRIPTION OF THE PREFERRED EMBODIMENTS

The preferred embodiments of the invention will be described with reference to the figures. It should be understood that the preferred embodiments described here are only for illustration and explanation of the invention, and are not intended to limit the invention.

Figure 1:
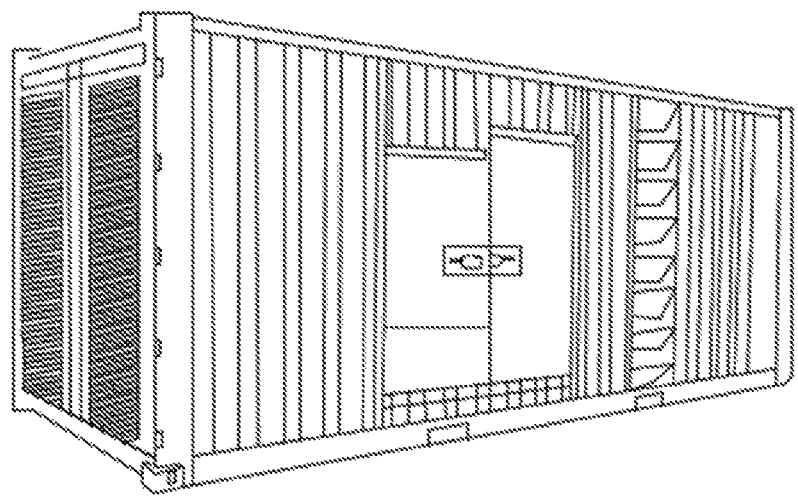
FIG. 1 is a three-dimensional diagram of existing energy storage system.
Figure 2:
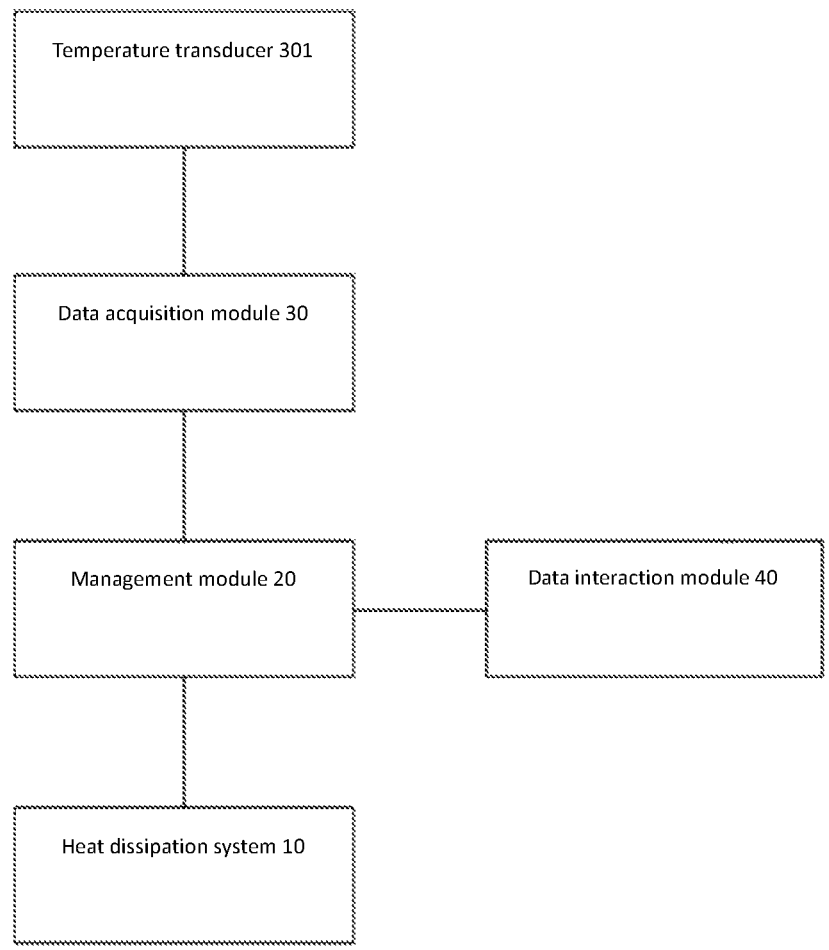
FIG. 2 is a schematic diagram of the thermal management device for energy storage system in an embodiment of the invention.

As shown in FIG. 2, an embodiment of the invention provides a thermal management device for energy storage system, wherein the thermal management device for energy storage system comprises a heat dissipation system 10, a temperature transducer 301, a data acquisition module 30, a management module 20 and a data interaction module 40.

The heat dissipation system 10 comprises refrigerant circulating heat exchange components for heat dissipation of energy storage system, wherein the refrigerant circulating heat exchange components perform heat exchange through phase change of refrigerant.

The data acquisition module 30 is connected with the temperature transducer 301, and is used for acquiring the external environment temperature and the working environment temperature of energy storage system.

The management module 20 is used for conducting heating value analysis of energy storage system, and then performing heat dissipation control and management according to the heating value analysis and the external environment temperature.

The data interaction module 40 is used for connecting the network for data interaction.

The working principle and beneficial effects of the above technical scheme are as follows: the energy storage system of the scheme is a modular distributed system. For the electrical equipment that need heat dissipation in the energy storage system, a thermovent is set, the above heat dissipation system, i.e., the heat dissipation system of the thermal management device for the energy storage system, is arranged at the thermovent, the data acquisition module is connected with the transducer to acquire data, and the management module conducts heating value analysis of energy storage system, and then performs heat dissipation control and management according to the heating value analysis and the external environment temperature, so as to ensure that the refrigerant circulating heat exchange components of the heat dissipation system perform heat exchange through phase change of refrigerant, wherein the phase change process uses the latent heat characteristics of refrigerant to increase the heat exchange temperature difference, improve the heat exchange efficiency, reduce the energy consumption of the energy storage system for heat dissipation, and realize energy conservation under the condition of ensuring the working temperature of the energy storage system; besides, one-button emergency shutdown is set to ensure the system safety; the data interaction module is set to connect with the network for data interaction to enable remote access and control, thus reducing workload and labor and improving efficiency.

Figure 3:
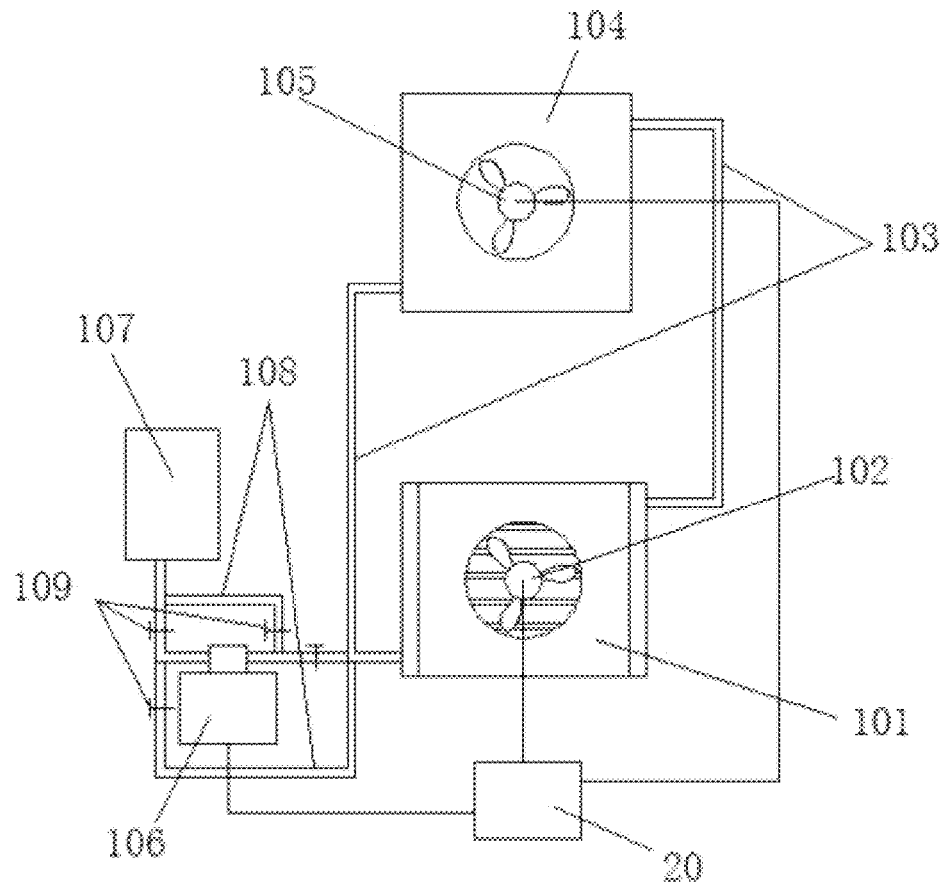
FIG. 3 is a schematic diagram of the refrigerant circulating heat exchange components used in the heat dissipation system of the thermal management device for energy storage system in an embodiment of the invention.

In an embodiment, as shown in FIG. 3, the refrigerant circulating heat exchange components comprise a heat exchanger 101, a fan 102, a refrigerant pipeline 103, a radiator 104, a radiator fan 105, a regulating pump 106 and a refrigerant storage tank 107.

The heat exchanger 101 and the radiator 104 are connected through a refrigerant pipeline 103 to form a refrigerant circulating channel, with the radiator 104 installed above the heat exchanger 101.

The heat exchanger 101 and the fan 102 are installed at the thermovent of energy storage system, wherein the fan 102 is used for making the air pass through the heat exchanger 101 for heat exchange;

The radiator 104 and the radiator fan 105 are installed in the external environment, wherein the radiator fan 105 is used for making the outside air pass through the radiator 104 for heat dissipation;

The regulating pump 106 and the refrigerant storage tank 107 are connected with the refrigerant pipeline 103, and the inlet and outlet of the regulating pump 106 are provided with reversing pipelines 108 for pumping refrigerant into or out of the refrigerant pipeline 103, so as to regulate the refrigerant quantity in the refrigerant circulating channel.

The fan 102, the radiator fan 105 and the regulating pump 106 are all electrically connected with the management module 20.

The working principle and beneficial effects of the technical scheme are as follows: in the scheme, refrigerant is charged into the refrigerant circulating channel formed by connecting the heat exchanger, the radiator and the refrigerant pipeline; the liquid refrigerant absorbs the heat of energy storage system at the heat exchanger and becomes gaseous refrigerant, and the gaseous refrigerant flows down to the radiator under its own air pressure, transfers heat to the outside air in the radiator, and condenses into liquid refrigerant; since the radiator is installed above the heat exchanger, the liquid refrigerant flows to the heat exchanger through the refrigerant pipeline under the action of gravity to form refrigerant circulation. During heat exchange, refrigerant phase changes, thus increasing the heat exchange temperature difference, improving the heat exchange efficiency, reducing the energy consumption of energy storage system for heat dissipation, and realizing energy conservation under the condition of ensuring the working temperature of energy storage system; the connecting pipeline between the regulating pump and refrigerant storage tank and the refrigerant pipeline is provided with electric valve 109, and the reversing pipeline is also provided with electric valve 109, wherein the electric valve 109 is electrically connected to the management module, and the on/off of each electric valve is controlled to change the flow direction of refrigerant, so as to pump refrigerant into or out of the refrigerant pipeline, thus changing the refrigerant quantity in the refrigerant pipeline, ensuring that the refrigerant phase can change during heat exchange in the refrigerant circulation, and always realizing efficient heat exchange.

In an embodiment, the data acquisition module is connected with multiple pressure transducers, wherein the pressure transducers are respectively installed in the refrigerant pipeline and the refrigerant storage tank;

The management module is connected with an intelligent touch screen, wherein the intelligent touch screen is used for displaying a control interface to operate and/or view the running state.

The working principle and beneficial effects of the technical scheme are as follows: in the scheme, the pressure transducers are installed in the refrigerant pipeline and the refrigerant storage tank to monitor the refrigerant pressure in the refrigerant pipeline and the refrigerant storage tank, and regulate the refrigerant pressure in the refrigerant pipeline by the regulating pump according to the heat dissipation demands of energy storage system and the external environment temperature; because of the physical characteristics of refrigerant, the phase change temperature of refrigerant is directly related to the pressure, specifically, according to the heat exchange temperature demand of the radiator, the external environment temperature restricts the phase change temperature of refrigerant in the radiator, and adjusting the pressure can change the phase change temperature of refrigerant to adapt to the change of external environment temperature; besides, the intelligent touch screen is used for visualizing the state of the whole equipment and improving the intelligent control degree, thus greatly simplifying the operation and maintenance work.

In an embodiment, the management module comprises a memory and an arithmetic logic unit, and the data acquisition module is connected with a barometer, and is used for measuring the ambient pressure value; the memory is used for storing a curve of air volume and rotating speed of the radiator fan or a comparison of air volume and rotating speed of the radiator fan;

The arithmetic logical unit adopts the following formula to calculate the air supply volume at the state point for the operation of the radiator fan:

$$Q_{wind} = \frac{P_{standard} q_{power}(1-\xi)}{CP_{measured} \rho_{standard}(t_{exhaust} - t_{measured})}$$

Where, $Q_{wind}$ represents the air supply volume at the state point for the operation of the radiator fan, cm³/s; $P_{standard}$ represents the standard atmospheric pressure; $q_{power}$ represents the charging capacity or discharging capacity of energy storage system in unit time, W; $\xi$ represents the energy efficiency coefficient of energy storage system; C represents the specific heat of air; $P_{measured}$ represents the measured ambient pressure value; $\rho_{standard}$ represents the air density at standard atmospheric pressure; $t_{exhaust}$ represents the measured air exhaust temperature after passing through the radiator; $t_{measured}$ represents the detected environment temperature;

According to the calculated air supply volume at the state point of the radiator fan, the corresponding rotating speed of the radiator fan can be obtained from the curve of air volume and rotating speed or the comparison of air volume and rotating speed, so as to control the rotating speed of the radiator fan.

The working principle and beneficial effects of the technical scheme are as follows: in the scheme, the air supply volume at the state point for the operation of the radiator fan is calculated by the above set formula, and the curve of air volume and rotating speed of the radiator fan or the comparison of air volume and rotating speed of the radiator fan is stored in the intelligent control system; according to the calculated air supply volume at the state point, the corresponding rotating speed of the radiator fan is obtained from the curve of air volume and rotating speed or the comparison of air volume and rotating speed, so as to accurately control the rotating speed of the radiator fan. The above formula reflects the influence of different atmospheric pressures on the air volume of the radiator fan, and can be applicable to the air pressure difference caused by different altitudes or weather influences; different atmospheric pressures correspond to different air densities, and the same rotating speed of the radiator fan has different actual air volumes under different air densities, so using the above formula can avoid the adverse effects of different or changed atmospheric pressures, thus stabilizing the heat dissipation effect. This scheme is conducive to coordination control: can not only effectively prevent the temperature of energy storage system from exceeding the limit and reducing the energy storage efficiency or causing safety risks caused by poor heat dissipation, but also prevent the excessive air supply of the radiator fan from increasing the energy consumption, thus realizing energy conservation.

An embodiment of the invention provides an energy storage system, wherein the energy storage system comprises battery backs, a battery management system, a bidirectional converter, an energy management system and the above thermal management device for energy storage system.

The battery pack comprises multiple lithium iron phosphate battery modules, and the lithium iron phosphate batteries in the lithium iron phosphate battery modules are used for storing electric energy;

The battery management system is connected with the battery packs and the bidirectional converter respectively, and is used for managing the charging and discharging of battery;

The bidirectional converter comprises voltage-stabilizing and rectifying components and inverter components, wherein the voltage-stabilizing and rectifying components and the inverter components are both connected with the battery packs; the voltage-stabilizing and rectifying components are connected with a power generation equipment to adjust power generation and then charge battery, and the inverter components are connected with a power transmission equipment to change the electric energy stored in battery into a power supply can be used by the electric equipment;

The energy management system is connected with the battery management system and the bidirectional converter respectively, and is used for monitoring the battery power and managing the charging and discharging according to a predetermined strategy;

The battery packs, the battery management system, the bidirectional converter and the energy management system are configured with a heat dissipation system of the thermal management device for energy storage system, wherein the heat dissipation system comprises refrigerant circulating heat exchange components performing heat exchange through phase change of refrigerant.

The working principle and beneficial effects of the technical scheme are as follows: the energy storage system of the scheme is a modular distributed system and comprises battery packs, a battery management system, a bidirectional converter, an energy management system and a thermal management device for the energy storage system. For the electrical equipment (battery packs, battery management system, bidirectional converter and energy management system) that need heat dissipation in the energy storage system, a thermovent is set, the above heat dissipation system, i.e., the heat dissipation system of the thermal management device for the energy storage system, is arranged at the thermovent, the data acquisition module is connected with the transducer to acquire data, and the management module conducts heating value analysis of the energy storage system, and then performs heat dissipation control and management according to the heating value analysis and the external environment temperature. During the control of thermal management, data are acquired in real time to determine and control the refrigerant quantity required for refrigerant circulation and thus ensure that the refrigerant circulating heat exchange components of the heat dissipation system perform heat exchange through phase change of refrigerant, so as to increase the heat exchange temperature difference, improve the heat exchange efficiency, reduce the energy consumption of the energy storage system for heat dissipation, and realize energy conservation under the condition of ensuring the working temperature of the energy storage system; in the scheme, the battery pack is composed of the modular lithium iron phosphate batteries, the battery management system (BMS) is used for monitoring and managing the batteries, the energy management system (EMS) is used for managing the charging and/or discharging, and the thermal management device for the energy storage system is used for heat dissipation of the battery packs, the battery management system, the bidirectional converter and the energy management system.

In an embodiment, multiple battery packs are distributed;

The energy management system is internally provided with a managing model, and is used for monitoring the real-time capacity, charging capacity and discharging capacity of each battery pack;

The managing model generates multiple groups of managing schemes according to managing demands, and predicts power generation and/or electricity consumption through monitoring data; according to the prediction, loss analyses about the charging and/or discharging of each group of managing schemes are conducted to select the managing scheme with the minimum loss as the managing execution scheme.

The working principle and beneficial effects of the technical scheme are as follows: the energy storage system of the scheme is a modular distributed system, and multiple battery packs are distributed; the energy management system is used for monitoring the real-time capacity, charging capacity and discharging capacity of each battery pack; a managing model is arranged in the energy management system to predict power generation and/or electricity consumption through monitoring data; according to the prediction, loss analyses about the charging and/or discharging of each group of managing schemes are conducted to select the managing scheme with the minimum loss as the managing execution scheme, thus reducing the energy consumption of the energy storage system and improving the energy storage utilization rate.

In an embodiment, the voltage-stabilizing and rectifying components comprise a rectifying circuit and a voltage-stabilizing circuit, wherein the rectifying circuit converts the alternating current of power generation equipment into direct current, and the voltage-stabilizing circuit stabilizes the voltage of direct current to be the same as that of battery pack;

The inverter components comprise an inverter bridge circuit, a logic control circuit and a filter circuit, wherein the inverter bridge circuit is used for converting the direct current of battery pack into alternating current, the filter circuit is used for filtering the alternating current, and the logic control circuit is used for performing the logic control of process of converting the direct current into alternating current.

The working principle and beneficial effects of the technical scheme are as follows: in the scheme, the rectifying circuit converts the alternating current of the power generation equipment into direct current, and the voltage-stabilizing circuit stabilizes the voltage of direct current to be the same as that of battery pack, so as to realize the adaptation and connection between power generation equipment and battery pack, and avoid the damage to the equipment caused by different power supplies; the inverter bridge circuit converts the direct current of battery pack into alternating current, the filter circuit filters the alternating current, and the logic control circuit controls the process of converting direct current into alternating current, so as to convert the direct current of battery pack into standard alternating current in China, thus connecting the most existing power supply networks for power supply, saving power transmission cost and realizing utilization of stored energy.

Figure 4:
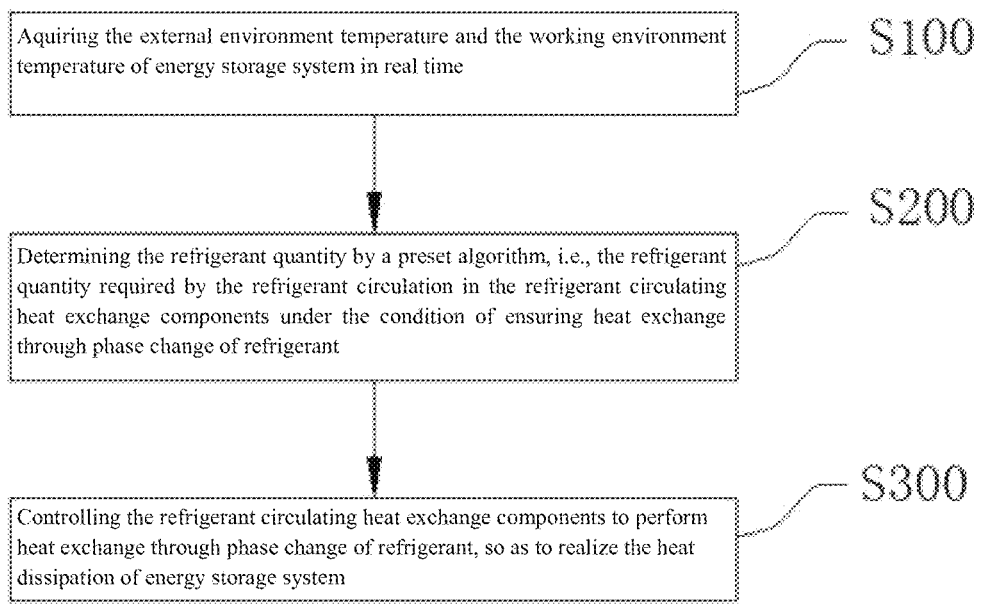
FIG. 4 is a flow chart of the method for controlling the thermal management device for energy storage system in an embodiment of the invention.

As shown in FIG. 4, an embodiment of the invention provides a method for controlling thermal management of energy storage system, wherein the method is used for the above thermal management device for energy storage system and comprises the following steps:

S100, acquiring the external environment temperature and the working environment temperature of energy storage system in real time;

S200, determining the refrigerant quantity by a preset algorithm, i.e., the refrigerant quantity required by the refrigerant circulation in the refrigerant circulating heat exchange components under the condition of ensuring heat exchange through phase change of refrigerant;

S300, controlling the refrigerant circulating heat exchange components to perform heat exchange through phase change of refrigerant, so as to realize the heat dissipation of energy storage system.

The working principle and beneficial effects of the technical scheme are as follows: the energy storage system of the scheme is a modular distributed system, and comprises battery packs, a battery management system, a bidirectional converter, an energy management system and a thermal management device for the energy storage system. For the electrical equipment (battery pack, battery management system, bidirectional converter and energy management system) that need heat dissipation in the energy storage system, a thermovent is set, the above heat dissipation system, i.e., the heat dissipation system of the thermal management device for the energy storage system, is arranged at the thermovent, the data acquisition module is connected with the transducer to acquire data, and the management module conducts heating value analysis of the energy storage system, and then performs heat dissipation control and management according to the heating value analysis and the external environment temperature. During the control of thermal management, data are acquired in real time to determine and control the refrigerant quantity required for refrigerant circulation through the regulating pump and thus ensure that the refrigerant circulating heat exchange components of the heat dissipation system perform heat exchange through phase change of refrigerant, so as to increase the heat exchange temperature difference, improve the heat exchange efficiency, reduce the energy consumption of the energy storage system for heat dissipation, and realize energy conservation under the condition of ensuring the working temperature of the energy storage system.

In an embodiment, in step S100, the whole process of charging and discharging the battery packs of energy storage system is monitored;

In step S200, the heat dissipation demand of energy storage system is predicted by the set prediction model, and is compared with the maximum heat dissipation capability of the refrigerant circulating heat exchange components, and if the predicted heat dissipation demand is greater than the maximum heat dissipation capability of the refrigerant circulating heat exchange components, then an alarm is given.

The working principle and beneficial effects of the above technical scheme are as follows: in the scheme, when thermal management is conducted on energy storage system, the heat dissipation demand of the energy storage system is predicted in advance, and then heat dissipation is evaluated in combination with the maximum heat dissipation capability of the refrigerant circulating heat exchange components; if the predicted heat dissipation capability cannot meet the demand, an alarm is given in advance to remind the staff to take corresponding measures, such as stopping the working of some battery packs, so as to prevent the failure or danger caused by high temperature.

Obviously, those skilled in the art can make various modifications and variations to the invention without departing from the spirit and scope of the invention. In this way, if these modifications and variations of the invention fall within the scope of the claims of the invention and the equivalents of the claims, the invention is also intended to include these modifications and variations.

What is claimed is:

1. A thermal management device for energy storage system, comprising a heat dissipation system, a temperature transducer, a data acquisition module, a management module and a data interaction module;
   wherein the heat dissipation system comprises refrigerant circulating heat exchange components for heat dissipation of energy storage system, and the refrigerant circulating heat exchange components perform heat exchange through phase change of refrigerant;
   wherein the refrigerant circulating heat exchange components comprise a heat exchanger, a fan, a refrigerant pipeline, a radiator, a radiator fan, a regulating pump and a refrigerant storage tank;
   wherein the heat exchanger and the radiator are connected through a refrigerant pipeline to form a refrigerant circulating channel, with the radiator installed above the heat exchanger;
   wherein the heat exchanger and the fan are installed at the thermovent of energy storage system, wherein the fan is configured to make the air pass through the heat exchanger for heat exchange;
   wherein the radiator and the radiator fan are installed in the external environment, wherein the radiator fan is used for making the outside air pass through the radiator for heat dissipation;
   wherein the regulating pump and the refrigerant storage tank are connected with the refrigerant pipeline, and the inlet and outlet of the regulating pump are provided with reversing pipelines for pumping refrigerant into or out of the refrigerant pipeline, so as to regulate the refrigerant quantity in the refrigerant circulating channel;
   wherein the fan, the radiator fan and the regulating pump are all electrically connected with the management module;
   wherein the data acquisition module is connected with the temperature transducer, and is configured to acquire the external environment temperature and the working environment temperature of energy storage system;
   wherein the management module is configured to conduct heating value analysis of energy storage system, and then performing heat dissipation control and management according to the heating value analysis and the external environment temperature; the management module comprises a memory and an arithmetic logic unit, and the data acquisition module is connected with a barometer, and the barometer is configured to measure an ambient pressure value; the memory is configured to store a curve of an air volume and a rotating speed of the radiator fan or a comparison of the air volume and the rotating speed of the radiator fan;
   wherein the arithmetic logic unit adopts a following formula to calculate an air supply volume at a state point for operation of the radiator fan:

$$Q_{wind} = \frac{P_{standard} q_{power} (1 - \xi)}{C P_{measured} \rho_{standard} (t_{exhaust} - t_{measured})}$$

where, $Q_{wind}$ represents the air supply volume at the state point for the operation of the radiator fan, cm$^3$/s; $P_{standard}$ represents a standard atmospheric pressure; $q_{power}$ represents charging capacity or discharging capacity of energy storage system in unit time, W; $\xi$ represents an energy efficiency coefficient of the energy storage system; C represents a specific heat of air; $P_{measured}$ represents a measured ambient pressure value; $\rho_{standard}$ represents an air density at the standard atmospheric pressure; $t_{exhaust}$ represents a measured air exhaust temperature after passing through the radiator; $t_{measured}$ represents a detected environment temperature;
   wherein according to the calculated air supply volume at the state point of the radiator fan, the corresponding rotating speed of the radiator fan is obtained from the curve of the air volume and the rotating speed of the radiator fan or the comparison of the air volume and the rotating speed of the radiator fan, so as to control the rotating speed of the radiator fan; and
   wherein the data interaction module is configured to connect the network for data interaction.

2. The thermal management device for energy storage system according to claim 1, wherein the data acquisition module is connected with multiple pressure transducers, wherein the pressure transducers are respectively installed in the refrigerant pipeline and the refrigerant storage tank.

3. The thermal management device for energy storage system according to claim 1, wherein the management module is connected with an intelligent touch screen, wherein the intelligent touch screen is used for displaying a control interface to operate and/or view the running state.

4. An energy storage system comprising battery packs, a battery management system, a bidirectional converter, an energy management system and the thermal management device for energy storage system in claim 1;
   wherein a battery pack comprises multiple lithium iron phosphate battery modules, and the lithium iron phosphate batteries in the lithium iron phosphate battery modules are configured to store electric energy;
   wherein the battery management system is connected with the battery packs and the bidirectional converter respectively, and is configured to manage the charging and discharging of battery;
   wherein the bidirectional converter comprises voltage-stabilizing and rectifying components and inverter components, wherein the voltage-stabilizing and rectifying components and the inverter components are both connected with the battery packs; the voltage-stabilizing and rectifying components are connected with a power generation equipment to adjust power generation and then charge battery, and the inverter components are connected with a power transmission equipment to change the electric energy stored in battery into a power supply can be used by an electric equipment;
   wherein the energy management system is connected with the battery management system and the bidirectional converter respectively, and is configured to monitor the battery power and managing the charging and discharging according to a predetermined strategy;
   wherein the battery packs, the battery management system, the bidirectional converter and the energy management system are configured with a heat dissipation system of the thermal management device for energy storage system, wherein the heat dissipation system comprises refrigerant circulating heat exchange components performing heat exchange through phase change of refrigerant;

wherein the battery packs have a plurality of packs which are distributed;

wherein the energy management system is internally provided with a managing model, and is configured to monitor a real-time capacity, a charging capacity and a discharging capacity of each of the battery packs; and wherein the managing model generates multiple groups of managing schemes according to managing demands, and predicts power generation and/or electricity consumption through monitoring data; according to the prediction, loss analyses about the charging and/or discharging of each group of the managing schemes are conducted to select a managing scheme with a minimum loss as a managing execution scheme.

5. The energy storage system according to claim 4, wherein the voltage-stabilizing and rectifying components comprise a rectifying circuit and a voltage-stabilizing circuit, wherein the rectifying circuit converts the alternating current of power generation equipment into direct current, and the voltage-stabilizing circuit stabilizes the voltage of direct current to be the same as that of battery pack.

6. The energy storage system according to claim 4, wherein the inverter components comprise an inverter bridge circuit, a logic control circuit and a filter circuit, wherein the inverter bridge circuit is configured to convert the direct current of battery pack into alternating current, the filter circuit is configured to filter the alternating current, and the logic control circuit is configured to perform the logic control of process of converting the direct current into alternating current.

7. A method for controlling the thermal management of energy storage system according to claim 1, wherein the method comprises the following steps:

S100, acquiring the external environment temperature and the working environment temperature of energy storage system in real time;

S200, determining the refrigerant quantity by a preset algorithm, i.e., the refrigerant quantity required by the refrigerant circulation in the refrigerant circulating heat exchange components under the condition of ensuring heat exchange through phase change of refrigerant; and S300, controlling the refrigerant circulating heat exchange components to perform heat exchange through phase change of refrigerant, so as to realize the heat dissipation of energy storage system.

8. The method for controlling thermal management of energy storage system according to claim 7, wherein in the step S100, the whole process of charging and discharging battery packs of energy storage system is monitored;

wherein in the step S200, the heat dissipation demand of energy storage system is predicted by the set prediction model, and is compared with the maximum heat dissipation capability of the refrigerant circulating heat exchange components, and if the predicted heat dissipation demand is greater than the maximum heat dissipation capability of the refrigerant circulating heat exchange components, then an alarm is given.

* * * * *